UNITED STATES PATENT OFFICE.

ALEXANDER CLASSEN, OF AIX-LA-CHAPELLE, GERMANY.

PROCESS OF TREATING COMMINUTED WOOD, &c.

SPECIFICATION forming part of Letters Patent No. 726,029, dated April 21, 1903.

Application filed August 30, 1902. Serial No. 121,676. (No specimens.)

*To all whom it may concern:*

Be it known that I, ALEXANDER CLASSEN, a citizen of Germany, residing at 57 Templergraben, Aix-la-Chapelle, in the Empire of Germany, have invented a certain new and useful Process of Treating Comminuted Wood, &c., (for which I have applied for a patent in Great Britain, dated August 6, 1902, No. 17,299,) of which the following is a specification.

My invention relates to a treatment of comminuted wood—such as sawdust, shavings, or chips, peat, or the like cellulose material—whereby it is brought into a condition suitable for its consolidation by pressure into any desired form, such as briquets or slabs. For this purpose I moisten the material to be treated with a dilute acid having an effect on the cellulose which causes the particles of the material to cohere when pressed together. Examples of suitable acids are hydrochloric acid, nitric acid, sulfurous and sulfuric acid. The moistened material is then introduced into a suitable vessel, preferably a drum revolving on a horizontal axis, lined with lead or other material which will resist the attack of the acid used. The vessel is then closed and heated externally or internally by introduction of superheated or high-pressure steam, so as to raise the temperature to 105° to 145° centigrade and to maintain it at this point for from thirty to sixty minutes. The temperature and the time of the process may greatly vary, though what I have just suggested would ordinarily produce satisfactory results. At the end of this time the vessel is opened and the mass lixiviated with water. The material is then dried, whereupon it is ready for compression into the desired consolidated form. By means of this treatment the elasticity of the material is removed and the particles acquire the property of cohering under pressure without the use of an agglutinant, so as to form a solid and exceedingly dense briquet or slab or piece of any desired shape, which has no tendency to disintegrate, but remains a permanent solid substance capable when sufficient pressure is used in forming it of receiving a high polish. This material may be used to make articles of manufacture which are now made of wood. It may be used for making insulating-fixtures for electrical appliances, it may be converted into charcoal, burned as fuel, or used in any other manner the nature of the material will permit. It may also be readily molded into ornamental designs for buildings, furniture, and the like.

The proportion of dilute acid to be added to the material depends on the nature of the latter, but should not be more than sufficient to thoroughly moisten the material. The degree of dilution of the acid also depends on the nature of the material and on the nature of the acid; but I have found that for sawdust and for hydrochloric acid, for example, a solution containing about five per cent. of real acid is suitable. For example, when I use ordinary deal-sawdust I add one part, by weight, of dilute hydrochloric acid containing about five per cent. of real acid to three parts, by weight, of the sawdust.

The temperature selected for the treatment is chosen in relation to the degree of consolidation required. The higher the temperature used within the limits named the higher will be the specific gravity of the compressed product. If the temperature is carried far over 145° centigrade, carbonization of the material will generally ensue.

The treatment of sawdust for producing sugar by heating it in a closed vessel with sulfurous acid and sulfuric acid under certain conditions is known, and I do not claim such treatment; but,

Having thus described the nature of this invention and the best means I know of carrying the same into practical effect, I claim—

The process of treating comminuted wood, peat or like cellulose material, which consists in moistening the material with acid, then heating the moistened material until the particles have acquired the property of cohering under pressure, then lixiviating said material, then drying and compressing said material into a compact solid piece.

In testimony whereof I have hereunto set my hand in presence of two subscribing witnesses.

ALEXANDER CLASSEN.

Witnesses:
JOHN B. ADAMS,
WILLIAM J. REUTERS.